US006367686B1

(12) United States Patent
Abriles et al.

(10) Patent No.: US 6,367,686 B1
(45) Date of Patent: Apr. 9, 2002

(54) SELF CLEANING BRAZE MATERIAL

(75) Inventors: Beth Kwiatkowski Abriles, North Branford; David A. Rutz, Glastonbury; Bryan W. Manis, Woodstock, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/652,823

(22) Filed: Aug. 31, 2000

(51) Int. Cl.$^7$ .......................... B23K 1/20; B23K 31/00; B23K 35/34

(52) U.S. Cl. .................... 228/206; 228/248.1; 228/205; 148/23; 148/24

(58) Field of Search .................... 228/205, 206, 228/248.1, 248.5; 148/23, 24

(56) References Cited

U.S. PATENT DOCUMENTS

| | | | | |
|---|---|---|---|---|
| 3,663,313 A | * | 5/1972 | Oberly et al. | 148/23 |
| 3,769,099 A | * | 10/1973 | DeLong et al. | 148/26 |
| 4,235,649 A | * | 11/1980 | Inamura et al. | 148/23 |
| 4,762,573 A | * | 8/1988 | Biverstedt | 148/23 |
| 5,190,596 A | * | 3/1993 | Timsit | 148/23 |
| 5,437,737 A | * | 8/1995 | Draghi et al. | 148/23 |
| 5,735,448 A | | 4/1998 | Draghi et al. | |
| 6,140,607 A | * | 10/2000 | Kamada et al. | 219/145.22 |

* cited by examiner

Primary Examiner—Tom Dunn
Assistant Examiner—Zidia Pittman
(74) Attorney, Agent, or Firm—Bachman & LaPointe

(57) ABSTRACT

The present invention relates to a self cleaning braze paste which is used in the repair of gas turbine engines. The braze paste comprises lithium fluoride in an amount sufficient to act as a flux which allows the braze material to flow into a crack or void in a part to be repaired up to an amount where there is no residual lithium or fluoride in the crack or void, preferably up to about 20% by volume, a gel binder in an amount up to about 15% by volume, and the balance comprising at least one of a nickel braze alloy and a cobalt braze alloy. In a preferred embodiment, the lithium fluoride is present in an amount from about 10% to about 15% by volume. The braze material of the present invention may be applied in a paste form or, alternatively, in a paint or tape form. A method for cleaning and repairing a braze joint is also disclosed. The method broadly comprises the steps of forming a braze material containing lithium fluoride in the above mentioned range, a gel binder in an amount up to about 15% by volume, and the balance comprising at least one of a nickel braze alloy or a cobalt braze alloy, applying the braze material to the braze joint, and heating the braze material to a temperature in the range of from about a temperature sufficient to cause the lithium fluoride to volatize up to about 2300° F. for a time period from about 1.0 minute to about 30.0 minutes.

20 Claims, No Drawings ns can produce a finish that is too rough for brazing operations. As a result, inspectors must often manually scrape the braze joints to remove oxides, embedded grit, and the like from joint surfaces, which is very time consuming.

SELF CLEANING BRAZE MATERIAL

BACKGROUND OF THE INVENTION

The present invention is directed to a braze material, in either paste, paint or tape form, which is useful for repairing gas turbine engine parts and a method for repairing braze joints using said braze material.

Routine maintenance of gas turbine engines involves disassembling the engines, inspecting parts to determine whether they are reusable or require repair or replacement, and ultimately rebuilding the engines with reused, repaired, or replacement parts. Various methods are used to repair gas turbine engine parts including brazing. For example, high pressure compressor stator assemblies, which comprise inner and outer shrouds that support a number of brazed in compressor vanes, are often repaired by debrazing the vanes, cleaning and repairing the shrouds and reusable vanes, and brazing reusable and replacement vanes to the shrouds to rebuild the stator assembly.

The step of cleaning the shrouds to remove oxides that form during engine operation is important to obtain a clean, sound braze when rebuilding a stator assembly. Current cleaning methods include grit blasting and aqueous degreasing. While these methods can satisfactorily clean many shrouds, they typically need either a line of sight to the oxides (for grit blasting) or strong chemical compositions (for aqueous degreasing). Due to the complicated geometry of the shrouds, it is often difficult or impossible to get the line of sight needed for effective grit blasting. The option of using strong chemical compositions is becoming less desirable as repair shops look for ways to lessen the environmental impact of their operations. Even when grit blasting or aqueous degreasing are options, the time and effort required for satisfactory cleaning may be unacceptable to customers. Moreover, grit blasting and/or aqueous degreasing operations can be so aggressive that they damage shrouds to the extent that an entire stator assembly may need to be scrapped. Scrapping a stator assembly is costly to the customer and can delay engine reassembly while a replacement assembly is obtained.

U.S. Pat. No. 5,735,448 relates to a method of repairing surface and near surface defects in superalloy articles such as gas turbine engine components. In this method, after the base metal surface of the article has been cleaned, a repair coating is applied to the base metal surface of the article. The repair coating comprises a composition selected from the group consisting of between about 20 wt % and about 60 wt % volatile organic carrier and between about 20 wt % and about 60 wt % water-based carrier. The repair coating further comprises up to about 8 wt % of a fluxing agent including a halide compound and up to about 5 wt % of a thickening agent. The balance of the coating is metallic filler mix comprising a first finely-divided homogenous particulate component substantially corresponding in composition to that of the article and a second finely-divided homogenous particulate component having as its base the same base metal as that of the article and containing a melting point depressant in a quantity substantially exceeding that present in the article. The volatile organic carrier may be methyl alcohol, ethyl alcohol, or ether. The water-based carrier may be a gel binder such as Nicrobraz Cement-S. The thickening may be any substance capable of congealing the repair coating such as starches, gums, casein, gelatin, and phycocolloids, semisynthetic cellulose derivatives, and polyvinyl alcohol and carboxyvinylates. The fluxing agent includes halide compounds such as fluorides, bromides, chlorides, or mixtures thereof.

The engine repair industry needs a quicker, more reliable method of cleaning gas turbine engine parts required to support brazements.

SUMMARY OF THE INVENTION

Accordingly, it is an object of the present invention to provide an improved braze material which may be used to clean and repair engine parts.

It is a further object of the present invention to provide a quicker, more reliable method of cleaning gas turbine engine parts required to support brazements.

It is yet another object of the present invention to provide a more reliable method for repairing gas turbine engine parts.

The foregoing objects are attained by the braze material and the method of the present invention.

In accordance with the present invention, a braze material which cleans and repairs cracks and voids in braze joints in engine parts is provided. The braze material broadly comprises lithium fluoride in an amount sufficient to act as a flux which allows the braze material to flow into a crack or void in a part to be repaired up to an amount where there is no residual lithium or fluoride in the crack or void, and preferably up to about 20% volume, a gel binder in an amount up to about 15% by volume, and the balance comprising at least one of a nickel braze alloy and a cobalt braze alloy. In a most preferred embodiment, lithium fluoride is present in an amount from about 10% to about 15% by volume.

The braze material of the present invention may be applied in a paste form or, alternatively, in a paint or tape form. When the braze material is to be applied in paint form, up to 50% of its volume may comprise a suitable solvent. When the braze material is to be applied in tape form, the gel binder is replaced by a flexible binder of the type usually used to form tape products.

A method for cleaning and repairing a braze joint is also disclosed. The method broadly comprises the steps of forming a braze material containing lithium fluoride in an amount effective to act as a flux which allows the braze material to flow into a braze joint to be repaired up to an amount where there is no residual lithium or fluoride in the crack or void, and preferably up to about 20% by volume, a gel binder in an amount up to about 15% by volume, and the balance comprising at least one of a nickel braze alloy and a cobalt braze alloy, applying the braze material to the braze joint, and heating the braze material to a temperature in the range of from about a temperature sufficient to cause the lithium fluoride to volatize up to about 2300° F., preferably up to about 2200° F., and most preferably up to about 1950° F., for a time period from about 1.0 minute to about 30.0 minutes. As previously mentioned, the braze material may be applied in paste form, in paint form, or in tape form.

Other details of the braze material and the cleaning and repair method of the present invention, as well as other objects and advantages attendant thereto, are set forth in the following detailed description.

DETAILED DESCRIPTION OF THE PREFERRED EMBODIMENT(S)

It is not uncommon for gas turbine engine repair units to receive engine components, such as high pressure compressor stators, with braze joints that exhibits voids, service induced cracks, and/or lack of braze in joints that are difficult to adequately clean prior to braze repair. It is also known that cleaning methods such as grit blasting and aqueous degreasing may not successfully remove engine oxides. Thus, a braze material that contains a self-cleaning component is highly desirable.

In accordance with the present invention, a self cleaning braze material is provided. The material contains lithium fluoride, a nickel braze alloy, and a gel binder. The lithium fluoride is present in an amount sufficient to act as a flux and enhance the flow of the braze material into the contaminated joint up to an amount where there is no residual lithium or fluoride in the crack or void, and preferably up to about 20% by volume. In a preferred braze material, lithium fluoride is present in an amount from about 10% to about 15% by volume. Lithium fluoride has been found to be a particularly desirable material because it volatizes during the thermal cycle used during the brazing operation. Further, neither the lithium nor the fluoride diffuses into the base material. Instead, the lithium and the fluoride are released to the atmosphere.

Still further, it has been found that the fluoride component in the lithium fluoride bonds with the surface oxides and removes them from the contaminated surface(s). This allows the braze material to properly wet and fill the braze anomaly.

The braze material of the present invention also contains a gel binder to facilitate formation of the braze material into a paste. The gel binder is present in an amount up to about 15% by volume, preferably from about 5 vol % to about 15 vol %. The gel binder may comprise any suitable conventional gel binder known in the art. For example, a gel binder known as Nicrobraz S-Binder manufactured by Wall Colmonoy Corporation may be used. This gel binder is characterized by a specific gravity of 0.998 @ 20° C. and a vapor pressure of 17.53 mm Hg @ 20° C. and is a non-flammable, non-toxic, odor free, suspension agent that can be mixed with a brazing filler metal powder to form a thixotropic substance.

When the braze material is to be used in paste form, the remainder of the material comprises at least one of a nickel braze alloy and a cobalt braze alloy. The nickel or cobalt braze alloy used in the braze material may comprise any suitable nickel braze alloy and/or any suitable cobalt braze alloy known in the art. For example, a nickel braze alloy consisting essentially of from about 17.5 wt % to about 18.5 wt % nickel and the balance essentially gold may be used in the braze material of the present invention. Alternatively, a nickel braze alloy known as AMS 4777 and consisting essentially of 4.5 wt % silicon, 7.0 wt % chromium, 3.1 wt % boron, 3.0 wt % iron, and the balance essentially nickel may be used in the braze material of the present invention.

In a preferred embodiment of the present invention, the lithium fluoride and the braze alloy are initially each in a powder form where each of the powders has a particle size in the range of from about −60 mesh to about −325 mesh. To form a braze material in paste form, the lithium fluoride powder and the braze alloy powder are mixed together. Thereafter, the gel binder is added to the mixture. The mixture with the gel binder is then stirred gently to form the paste. A syringe may be used to apply the braze material in paste form to fill the crack, void or other braze anomaly to be repaired.

For some applications, it may be desirable to utilize the braze material of the present invention in paint form. To form a paint version, a solvent is added to the mixture. The solvent may comprise any suitable solvent known in the art including but not limited to water-based solvents, alcohol-based solvents, and mixtures thereof. Depending upon the consistency that is required, the solvent may be present in an amount up to about 50 vol %. When the braze material of the present invention is used in paint form, it may be applied to the part or braze joint to be repaired using a brush or spray gun.

For some applications, it may be desirable to utilize the braze material of the present invention in a tape form. To form a tape version, the gel binder is replaced by a flexible binder. The flexible binder may be any conventional binder known in the art used to form a transfer tape. Typically, the flexible binder is present in an amount from about 5% by volume to about 8% by volume.

The braze material of the present invention may be used to repair cracks and voids in gas turbine engine components, particularly those formed from nickel-based and cobalt-based superalloys. For example, the braze material of the present invention may be used to clean and repair braze joints in components formed from Inconel 718 and a material designated as Inconel X-750. Inconel 718 is a metal alloy which consists of 19 wt % chromium, 3.0 wt % molybdenum, 5.1 wt % columbium, 0.90 wt % titanium, 0.50 wt % aluminum, 18 wt % iron, and the balance essentially nickel. Inconel X-750 is a metal alloy which consists of 15.5 wt % chromium, 0.95 wt % columbium, 2.5 wt % titanium, 0.70 wt % aluminum, 7.0 wt % iron, and the balance essentially nickel.

To clean and repair a crack, a void, or another braze anomaly in an engine component, the braze material of the present invention is applied to the crack or the void either as a paste, a paint, or a tape. Thereafter, the braze material and the component being cleaned and repaired are subjected to a thermal treatment cycle wherein the braze material and the component to which it has been applied are heated to a temperature in the range of from about a temperature where the lithium fluoride volatizes to a temperature up to about 2300° F., preferably up to about 2200° F., and most preferably up to about 1950° F., for a time in the range of from about 1.0 to about 30.0 minutes.

During the braze repair of a gas turbine engine component, such as a high pressure compressor stator, a vacuum may be used to prevent oxidation during the thermal treatment and allow adequate braze flow. If the joints have been previously contaminated with oxides from engine service, the vacuum will help prevent the formation of additional oxides. The vacuum however can not sufficiently reduce those oxides present to allow adequate braze flow into the joint. The self-cleaning mechanism of the braze material of the present invention is capable of cleaning the surface of the oxidized and/or contaminated joint during the thermal treatment cycle, allowing the braze material to flow into the joint area.

To demonstrate the improvements provided by the braze material of the present invention, a number of examples were carried out.

EXAMPLE I

Fluoride reacts readily with metallic oxides at elevated temperatures and has been used in fluxing compounds as a cleaning agent. Fluoride containing compounds are typically used in higher temperature applications. Therefore, several fluoride compounds were chosen to be added to a braze material. For purposes of comparison, polytetrafluoroethylene (TEFLON) powder was obtained and added in various concentrations to AMS 4777 braze alloy. Two other compounds were also chosen and added to the braze alloy—ammonium bi-fluoride ($NH_4F_2$) and lithium fluoride (LiF). The fluoride compounds were added in five, ten and fifteen percent (by volume) amounts to the AMS 4777 braze alloy. Nicobraz 'S' binder was used to convert the powder mixtures into paste.

It was found that LiF has the added advantage of lithium's ability to promote wetting and to increase flow of the filler metal. It was also found that it was difficult to properly add the ammonium bi-fluoride to the braze powder and convert it into a paste. This is because ammonium bi-fluoride is a large crystal salt and does not break down easily into small particles that readily mix with the braze powder.

Initially, engine run oxidized cracks were not available, so 'T' joints were fabricated from both Inconel 718 and Inconel X-750 base material sheet stock. The 'T' joints were oxidized in an air furnace at 1500° F. for a time period from 15 minutes to 2 hours. The trials were conducted using the above mentioned mixtures as well as baseline AMS 4777 on oxidized 'T' joints. After thermal treatment, the 'T' joints with the TEFLON and ammonium bi-fluoride braze pastes did not show any wetting/flow improvement over the baseline AMS 4777. Additionally, TEFLON and ammonium bi-fluoride braze fillets exhibited a sooty, black residue clinging to the braze joints. The joints with the 10–15 vol % LiF exhibited flow equal to or better than baseline AMS 4777. These joints consistently had the brightest surface finish and there was no evidence of black residue.

EXAMPLE II

Since the LiF did not leave residue and appeared to be equivalent or better than standard AMS 4777 paste, its potential as a self cleaning agent was further explored. More 'T' joints were assembled and oxidized. Additionally, a stator formed from Inconel X-750 that had several cracks in the base material was oxidized using the same procedure as the initial 'T' joint tests. Braze materials in paste and paint form were made with 15% by volume LiF, a Nicobraz-S gel binder, and AMS 4777. During these trials, self-cleaning braze paste, as well as a combination of self-cleaning braze paste and paint (paste that was thinned out with additional Nicobraz 'S' binder), was applied to the 'T' joints and cracks. The lower viscosity of the paint allows preplacement of self cleaning braze alloy further down into the crack which allows the lithium fluoride to begin cleaning the oxidized surface before the bulk of the braze past melts and flows into the joint. Visually, the 'T' joints and cracks appeared cleaner and subsequent metallurgical evaluation revealed cracks and 'T' joints repaired with self cleaning braze paste were filled more effectively than those repaired with baseline AMS 4777.

Electron microprobe analysis of a joint (Inconel X-750 base material) repaired with self-cleaning braze paste and paint confirmed that there was no evidence of residual lithium or fluoride in the braze alloy or the adjacent base material. An additional analysis was done on a joint that had a small void at the crack tip, again the electron microprobe did not find any evidence of diffused lithium or fluoride in the base material.

Chemical analysis using inductively coupled plasma (ICP) mass spectrometry of the braze alloy determined that after thermal treatment, there was insignificant levels (ppm) of lithium remaining. Five samples of the self-cleaning braze alloy (after thermal treatment) were submitted to electro-chemistry for leach tests to determine the levels of residual lithium and fluoride. The samples were immersed for 8 hours in hot de-ionized water, and after which a small amount of water was test. Insignificant levels of lithium and fluoride were observed in the reserved solution, 0.198 ppm and 0.248 ppm respectively.

EXAMPLE III

A corrosion test was conducted to determine if the addition of LiF had any effect on the base material during exposure to operating temperature. Self-cleaning braze alloy (AMS 4777 with 15% LiF) and baseline AMS 4777 were brazed on Inconel 718 and Inconel X-750 plates. A section was taken from each plate immediately after the braze cycle to act as a reference point. All four plates were run through a 1300° F. air furnace for ten hours. A sample was removed from each plate and metallurgically evaluated, checking for corrosion in the braze alloy region and comparing them to the original baseline samples. The four plates were then placed through five more cumulative thermal cycles; every ten hours a sample was removed from each plate. Over the entire 60 hour period, there was no difference between AMS 4777 with 15% LiF plus AMS 4777, nor was there any difference from the baseline without 60 hours of thermal exposure.

EXAMPLE IV

Two Inconel 718 and two Inconel X-750 flat specimens each had AMS 4777 plus 15% LiF and the aforementioned nickel-gold braze alloy plus 15% LiF applied and were exposed to the appropriate thermal cycles. A halide test using a Bernite Flux Detection Kit was performed on each plate. There was no evidence of residual fluorides after thermal treatment.

EXAMPLE V

Another test was conducted on a 13/14th stage high pressure compressor stator formed from Inconel 718 with two cracked braze joints, oxidized during engine operation, typically considered difficult to repair. The stator was aqueously cleaned and grit blasted using 240 grit silicon carbide. A thin layer of paint was applied to each joint, followed by a bead of paste (both paint and paste were the aforementioned nickel-gold braze alloy with 15% LiF by volume). The stator was exposed to a braze cycle. Upon visual inspection, it was noted that the brazements were very clean and sound, with no evidence of voiding or lack of braze. Again a halide test was performed. There was no evidence of residual fluoride. Metallurgical examination revealed acceptable joints (80% minimum coverage requirement). One joint had an area that was very wide and not completely filled, probably due to its size. However, it was observed that there was wetting of the braze alloy along the walls of the joint, indicative of pre-cleaning by the self-cleaning braze alloy. Overall, using both self-cleaning braze (15% LiF) paste and paint in combination worked well by pre-cleaning the joint and allowing flow of the alloy into the joint.

In the braze materials of the present invention, the lithium fluoride acts as a flux or activator, allowing the braze material to flow into an oxidized joint. The braze materials of the present invention have the advantage that the lithium fluoride is released during the standard thermal treatment cycle and does not adversely affect the base metal of the component being repaired. Further, the lithium fluoride provides localized cleaning. The fluoride component bonds with the surface oxides and removes them from the contaminated surface, allowing the braze to properly wet and fill the braze anomaly.

While the braze material of the present invention has been described as being used to repair cracks, voids, or braze anomalies on gas turbine engine components, the braze material could also be used to repair cracks, voids, or braze anomalies on other types of components and could be mixed with other metallic powders that are added to bridge wide gap joints or to produce high strength, ductile diffusion brazements.

Due to its cleaning ability, the braze material of the present invention reduces labor hours as well as turn time.

It is apparent that there has been provided in accordance with the present invention a self cleaning braze material which fully satisfies the means, objects, and advantages set forth hereinbefore. While the present invention has been described in accordance with specific embodiments thereof, other alternatives, variations, and modifications will become apparent to those skilled in the art having read the foregoing description. Therefore, it is intended to embrace such alternatives, variations, and modifications as fall within the broad scope of the appended claims.

What is claimed is:

1. A braze material for cleaning and repairing cracks and voids in a metallic component comprising lithium fluoride in an amount from that sufficient to act as a flux for allowing the braze material to flow into a crack or void to be repaired up to an amount where there is no residual lithium or fluoride in the crack or void, a gel binder in an amount up to about 15% by volume, and the balance comprising at least one of a nickel braze alloy and a cobalt braze alloy.

2. A braze material according to claim 1, wherein said lithium fluoride is present in a range from said sufficient amount up to about 20% by volume.

3. A braze material according to claim 1, wherein said lithium fluoride is present in an amount from about 10% to about 15% by volume.

4. A braze material according to claim 1, wherein said gel binder is present in an amount from about 5% by volume to about 15% by volume.

5. A braze material according to claim 1, wherein said balance comprises a nickel-gold braze alloy.

6. A braze material according to claim 5, wherein said nickel braze alloy consists of from about 17.5 wt % to about 18.5 wt % nickel and the balance gold.

7. A braze material according to claim 1, wherein said balance comprises a nickel braze alloy consisting essentially of 4.5 wt % silicon, 7.0 wt % chromium, 3.1 wt % boron, 3.0 wt % iron, and the balance essentially nickel.

8. A braze material according to claim 1, wherein said braze material is in paste form.

9. A braze material according to claim 1, wherein said braze material is in paint form and further comprises up to 50% by volume of a solvent selected from the group consisting of water, alcohol, and mixtures thereof.

10. A braze material according to claim 1, wherein said braze material is in tape form and further comprises from about 5% to about 8% by volume of a flexible binder.

11. A braze material according to claim 1, wherein said lithium fluoride and nickel braze alloy are both in powder form with said nickel braze alloy having a particle size in the range of from about −60 to −325 mesh and said gel binder forms said lithium fluoride and nickel braze alloy powders into a paste.

12. A method for cleaning and repairing a braze joint comprising:

forming a braze material containing lithium fluoride in an amount from that effective to act as a flux which allows the braze material to flow into said braze joint to be repaired up to an amount where there is no residual lithium or fluoride in said braze joint, a gel binder in an amount up to about 15% by volume, and the balance comprising at least one of a nickel braze alloy and a cobalt braze alloy;

applying said material to said braze joint; and heating said material to a temperature in the range of from a temperature sufficient to cause said lithium fluoride to volatize up to about 2300° F. for a time period from about 1 minute to about 30 minutes.

13. A method according to claim 12, wherein said heating step comprises heating said material to a temperature in the range from said temperature sufficient up to about 2200° F.

14. A method according to claim 12, wherein said heating step comprises heating said material to a temperature in the range of from said sufficient temperature to about 1950° F.

15. A method according to claim 12, wherein said applying step comprises applying said braze material to said braze joint in paste form.

16. A method according to claim 12, wherein said forming step comprising mixing said lithium fluoride in powder form, said nickel braze alloy in powder form, and said gel binder to form a paste.

17. A method according to claim 12, wherein said forming step comprising adding a solvent in an amount up to about 50% by volume and said applying step comprises applying said braze material to said braze joint in a paint form.

18. A method according to claim 17, wherein said step of adding a solvent comprises adding a solvent selected from the group consisting of water-based solvents, alcohol-based solvents, and mixtures thereof.

19. A method according to claim 12, wherein said applying step comprises applying said braze material to said braze joint in tape form.

20. A method according to claim 19, wherein said forming step comprises adding a flexible binder in an amount from about 5% by volume to about 8% by volume.

* * * * *